US011644542B2

(12) United States Patent
Shott et al.

(10) Patent No.: US 11,644,542 B2
(45) Date of Patent: May 9, 2023

(54) OPTICAL SENSOR WITH MEMS MMA STEERED TRANSMITTER AND STARING DETECTOR

(71) Applicant: Raytheon Company, Waltham, MA (US)

(72) Inventors: Craig O. Shott, Benson, AZ (US); Gerald P. Uyeno, Tucson, AZ (US); Benn H. Gleason, Tucson, AZ (US); Sean D. Keller, Tucson, AZ (US); Mark K. Lange, Tucson, AZ (US); Eric Rogala, Tucson, AZ (US); Vanessa Reyna, Tucson, AZ (US); Garret A. Odom, Tucson, AZ (US); Jon E. Leigh, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/479,896

(22) Filed: Sep. 20, 2021

(65) Prior Publication Data
US 2023/0087666 A1 Mar. 23, 2023

(51) Int. Cl.
G01S 7/481 (2006.01)
F41G 7/22 (2006.01)
G01S 17/66 (2006.01)

(52) U.S. Cl.
CPC .......... G01S 7/4817 (2013.01); F41G 7/2246 (2013.01); G01S 17/66 (2013.01)

(58) Field of Classification Search
CPC .... G01S 17/931; G01S 17/933; G01S 7/4811; G01S 7/4817; G02B 26/0833; G01J 3/0291
See application file for complete search history.

(56) References Cited

U.S. PATENT DOCUMENTS

| 5,404,375 | A  | 4/1995  | Kroeger et al. |
| 5,854,702 | A  | 12/1998 | Ishikawa et al. |
| 6,181,450 | B1 | 1/2001  | Dishman et al. |
| 6,271,953 | B1 | 8/2001  | Dishman et al. |
| 6,327,063 | B1 | 12/2001 | Rockwell |
| 6,567,574 | B1 | 5/2003  | Ma et al. |
| 6,792,028 | B2 | 9/2004  | Cook et al. |

(Continued)

OTHER PUBLICATIONS

"U.S. Appl. No. 17/007,917, Notice of Allowance dated Jan. 10, 2022", 14 pgs.

(Continued)

Primary Examiner — Jennifer D Bennett
Assistant Examiner — Erin R Garber
(74) Attorney, Agent, or Firm — Schwegman Lundberg & Woessner, P.A.

(57) ABSTRACT

An optical sensor uses a MEMS MMA to scan a narrow laser beam over a transmit FOR to provide active illumination and to correct the beam profile (e.g., collimate the beam, reduce chromatic aberrations, correct the beam profile or wavefront). A staring detector senses light within a receive FOR that at least partially overlaps the transmit FOR. By completely eliminating the dual-axis gimbal, this sensor architecture greatly reduces the volume and weight of the optical sensor while avoiding the deficiencies of known systems associated with either fiber or free-space coupling of the laser beam into an existing receiver.

21 Claims, 14 Drawing Sheets

(56) References Cited

U.S. PATENT DOCUMENTS

| | | | |
|---|---|---|---|
| 7,304,296 | B2 | 12/2007 | Mills et al. |
| 7,593,641 | B2 | 9/2009 | Tegge, Jr. |
| 7,626,152 | B2 | 12/2009 | King et al. |
| 7,660,235 | B2 | 2/2010 | Alicherry et al. |
| 8,301,027 | B2 | 10/2012 | Shaw et al. |
| 8,305,578 | B1 | 11/2012 | Mudge et al. |
| 8,368,889 | B2 | 2/2013 | Schwiegerling et al. |
| 8,823,848 | B2 | 9/2014 | Chipman et al. |
| 8,983,293 | B2 | 3/2015 | Frankel et al. |
| 9,473,768 | B2 | 10/2016 | Uyeno et al. |
| 9,477,135 | B1 | 10/2016 | Uyeno et al. |
| 9,632,166 | B2 | 4/2017 | Trail et al. |
| 9,857,226 | B2 | 1/2018 | LeMaster et al. |
| 10,209,439 | B2 | 2/2019 | Keller et al. |
| 10,243,654 | B1 | 3/2019 | Uyeno et al. |
| 10,444,492 | B2 | 10/2019 | Hopkins et al. |
| 10,718,491 | B1 | 7/2020 | Raring et al. |
| 10,969,598 | B2 | 4/2021 | Fest et al. |
| 10,998,965 | B2 | 5/2021 | Tong et al. |
| 11,042,025 | B2 | 6/2021 | Uyeno et al. |
| 11,333,879 | B2 | 5/2022 | Uyeno et al. |
| 2002/0141689 | A1 | 10/2002 | Qian et al. |
| 2002/0196506 | A1 | 12/2002 | Graves et al. |
| 2003/0062468 | A1 | 4/2003 | Byren et al. |
| 2003/0081321 | A1 | 5/2003 | Moon et al. |
| 2003/0185488 | A1 | 10/2003 | Blumenthal |
| 2004/0072540 | A1 | 4/2004 | Wilson et al. |
| 2004/0081466 | A1 | 4/2004 | Walther et al. |
| 2004/0141752 | A1 | 7/2004 | Shelton et al. |
| 2004/0258415 | A1 | 12/2004 | Boone et al. |
| 2005/0031255 | A1 | 2/2005 | Schroeder et al. |
| 2005/0100339 | A1 | 5/2005 | Tegge |
| 2005/0122566 | A1 | 6/2005 | Cicchiello |
| 2005/0286101 | A1* | 12/2005 | Garner ............... G03H 1/02 359/9 |
| 2005/0288031 | A1 | 12/2005 | Davis et al. |
| 2006/0038103 | A1 | 2/2006 | Helmbrecht |
| 2007/0031157 | A1 | 2/2007 | Yamada et al. |
| 2007/0036480 | A1 | 2/2007 | Wu |
| 2008/0050064 | A1 | 2/2008 | Sakai et al. |
| 2010/0149533 | A1 | 6/2010 | Fest |
| 2010/0166430 | A1 | 7/2010 | Alten |
| 2012/0002973 | A1 | 1/2012 | Bruzzi et al. |
| 2012/0008133 | A1 | 1/2012 | Silny et al. |
| 2012/0114337 | A1 | 5/2012 | Aoki |
| 2012/0155885 | A1 | 6/2012 | Hannah et al. |
| 2013/0271818 | A1 | 10/2013 | Bastien et al. |
| 2014/0063299 | A1 | 3/2014 | Fest et al. |
| 2015/0099476 | A1 | 4/2015 | Beals |
| 2015/0172218 | A1 | 6/2015 | Beshai |
| 2015/0311981 | A1 | 10/2015 | Inagaki et al. |
| 2015/0378242 | A1 | 12/2015 | Auxier et al. |
| 2016/0003677 | A1 | 1/2016 | Pezzaniti et al. |
| 2016/0043800 | A1 | 2/2016 | Kingsbury et al. |
| 2016/0234703 | A1 | 8/2016 | Aldana et al. |
| 2016/0294472 | A1 | 10/2016 | Palmer et al. |
| 2017/0293137 | A1 | 10/2017 | Zhao et al. |
| 2018/0231715 | A1 | 8/2018 | Bishop et al. |
| 2019/0011541 | A1* | 1/2019 | O'Keeffe ............... G01S 7/4817 |
| 2019/0154921 | A1 | 5/2019 | Xing et al. |
| 2020/0096761 | A1* | 3/2020 | Starman ............. G02B 26/0866 |
| 2020/0244359 | A1 | 7/2020 | Csonka et al. |
| 2021/0088776 | A1 | 3/2021 | Uyeno et al. |
| 2021/0091854 | A1 | 3/2021 | Uyeno et al. |
| 2021/0092260 | A1 | 3/2021 | Uyeno et al. |
| 2021/0109197 | A1* | 4/2021 | O'Keeffe ............... G01S 7/4816 |
| 2022/0196811 | A1* | 6/2022 | Lu ........................... G01S 7/497 |

OTHER PUBLICATIONS

"U.S. Appl. No. 17/007,917, Supplemental Notice of Allowability dated Apr. 19, 2022", 2 pgs.

"U.S. Appl. No. 16/871,602, Non Final Office Action dated Nov. 9, 2020", 18 pgs.

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"U.S. Appl. No. 17/007,917, Response filed Dec. 1, 2021 to Non Final Office Action dated Aug. 3, 2021", 16 pgs.

"High Contrast IR Wire Grid Polarizers", Edmund Optics, [Online], Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-lnfrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Kim, et al., "Demonstration of large-angle nonmechanical laser beam steering based on LC polymer polarization grating", Proc. of SPIE vol. 8052 80520T, (May 13, 2011), 13 pgs.

U.S. Appl. No. 17/007,917, filed Aug. 31, 2020, Electronically Steered Inter-Satellite Optical Communication System With Micro-Electromechanical (MEM) Micromirror Array (MMA).

* cited by examiner

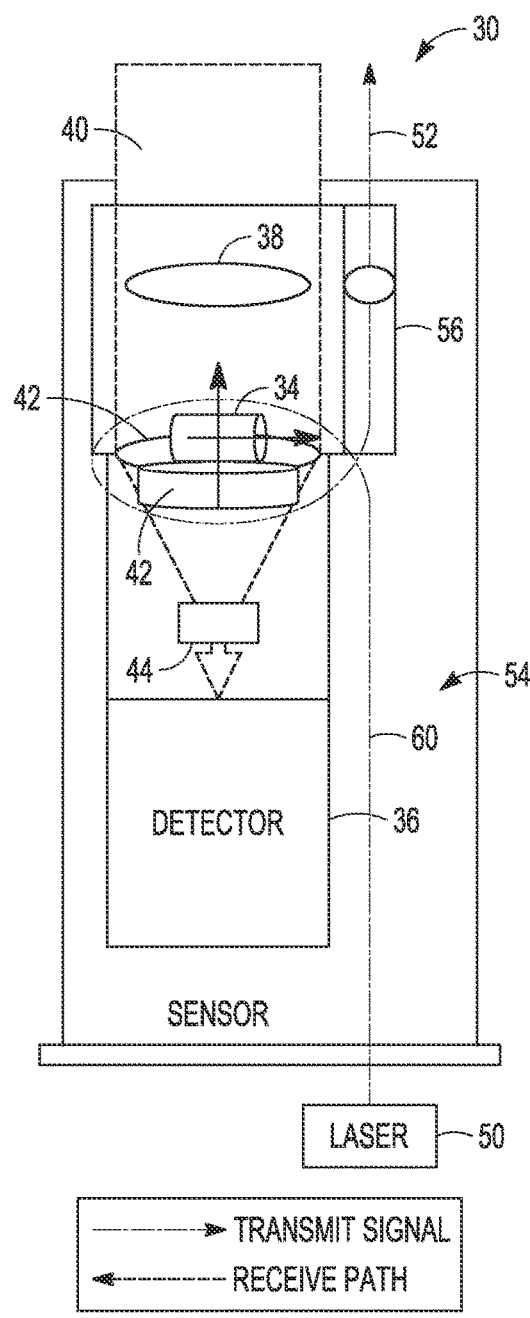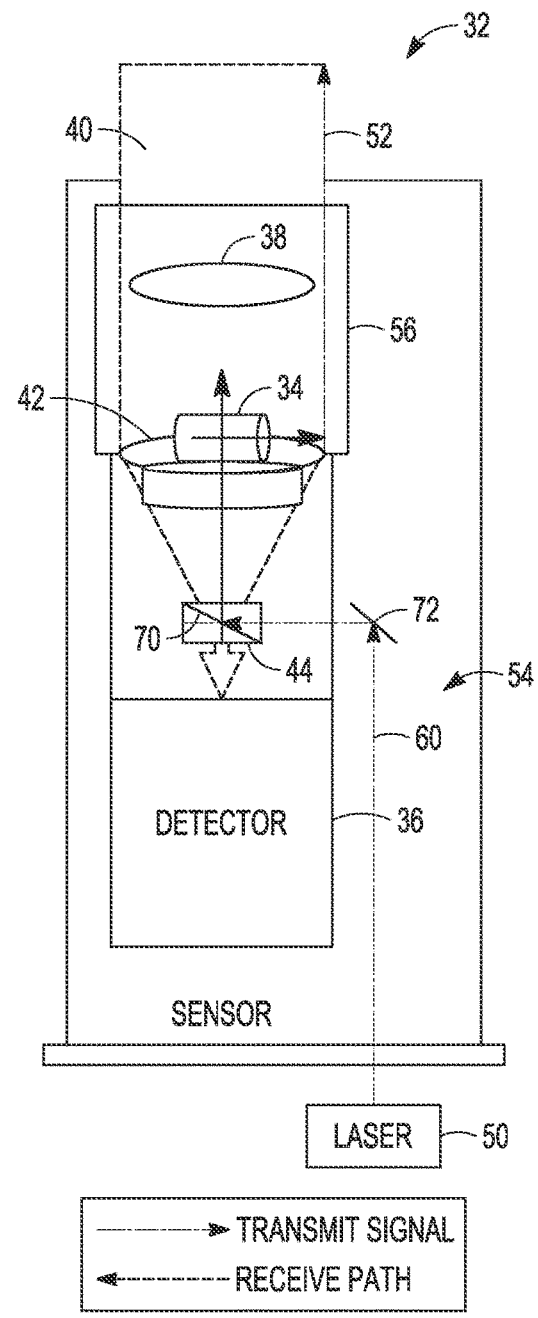
FIG. 2A
(PRIOR ART)
FIG. 2B
(PRIOR ART)

OPTICAL SENSOR WITH MEMS MMA STEERED TRANSMITTER AND STARING DETECTOR

BACKGROUND OF THE INVENTION

Field of the Invention

This invention relates to optical sensors that require active transmit as well as receive (passive or active) capabilities with constrained volume, weight and power.

Description of the Related Art

Gimbaled optical sensors are commonly used as part of guided munitions, aircraft and possibly autonomous vehicles. Passive systems use passive light e.g. infrared (IR) emissions or visible reflections from a target to detect and track the target. Active systems use an on-board source to emit a laser beam. e.g. ultra-violet (UV), IR or visible. The laser beam may be reflected from the target to actively detect and track the target to provide direction, extent, ranging, simple guidance commands to a target centroid or active imaging. The on-board laser may also be used for applications such as communications or other active transmit missions. The passive and active systems are often combined.

Referring now to FIG. 1, a guided munition 10 such as a missile, rocket, projectile etc., is are provided with a gimbaled optical sensor 14. The gimbaled optical sensor directs a laser beam 16 towards a scene 18, which reflects the light to generate a laser return 20 that is collected by the sensor's telescope. Within the sensor's field-of-view (FOV) 22 passive emissions or visible reflections 24 are also collected by the sensor's telescope. The gimbal scans the transmit signal 16 and sensor FOV 22 over a larger field-of-regard 26 to detect a target 28. The laser beam, and thus the returns, may be in the same or different band as the passive light. For example, the passive light may span a portion of the near infrared (NIR) band and the laser beam could occupy a very narrow band (few nm) around a specific wavelength(s) in the NIR band. Alternately, the passive light may span a portion of the NIR band and the laser beam could occupy a narrow band around a specific wavelengths(s) in the visible band. Other combinations of in and out of band active and passive light will exist. The sensor may be configured to not sense the laser return.

As shown in FIGS. 2A and 2B, typical gimbaled optical sensors 30 and 32 include a dual-axis gimbal 34 that includes an inner (nod) and outer (roll) gimbals positioned behind a protective and optically transparent dome or window. The inner (nod) and outer (roll) gimbals of dual-axis gimbal 34 rotate about inner and outer axes, typically orthogonal to each other, to point an optical axis. An off-gimbal detector 36 is responsive to a band of wavelengths e.g. UV, Visible or IR (SWIR, MWIR, NIR, LWIR, etc.) A telescope 38 mounted on the inner gimbal axis collects light 40 along the optical from the target to form an intermediate image. Gimbal optics 42 propagate the light 40 over the outer (roll) and inner (nod) gimbals along an optical path while preserving image quality. Off-gimbal focus optics 44 relay the intermediate image to the off-gimbal detector 36. In some applications, an Aperture Sharing Element (ASE) is positioned in a receive aperture to separate the incident light into different wavelength bands e.g. UV, Visible and IR and direct the light to different detectors.

The core gimbaled optical sensor to passively detect images was developed as a seeker for an air-to-air missile and has been adapted for different missile, aircraft, autonomous vehicle and other platforms to provide passive detection over a wide field-of-regard (FOR) in IR, Visible and UV bands or a combination thereof. A relatively simple optical system can provide the detector with a FOV of approximately 30×30 degrees. The dual-axis gimbal can scan this fixed FOV over a much larger FOR, typically 360 (roll)×90 (nod) degrees. In most applications, an extended receive FOR is critical to mission success.

To add active illumination capabilities to the seeker, an off-gimbal laser transmitter 50 emits a laser beam 52 in a narrowband around a specified wavelength. The laser is not typically positioned within the sensor volume. Rather it is positioned behind a bulkhead separating the sensor module from the platform. A fiber is run from the laser through the bulkhead into the sensor compartment.

Laser beam 52 is routed along an optical path 54 along the gimbal axes to a transmit telescope 56 mounted on the outer gimbal where it is transmitted toward the target and scanned over the FOR. Transmit telescope 56 may be a common shared telescope with telescope 38 or mounted adjacent and parallel to telescope 38.

As shown in FIG. 2A, sensor 30 connects a fiber 60 to laser transmitter 50, wraps the fiber 60 across the roll and nod gimbals 42 and connects the fiber to transmit telescope 56 to provide optical path 54. See U.S. Pat. No. 7,304,296 entitled "Optical Fiber Assembly Wrapped Across Gimbal Axes". The fiber-wrapped approach has several drawbacks. First, coupling the laser beam from an approximately 1 cm diameter into an approximately 100 micron fiber is inefficient and results in a loss of signal power. Although the fiber can support a fairly wide range of motion, the turret cannot be continuously rotated in "roll". The fiber can be brittle and posses a risk of breaking during operations. Lastly, the fiber is designed for a particular wavelength and thus cannot support multiple diverse wavelengths.

As shown in FIG. 2B, sensor 32 positions an Aperture Sharing Element (ASE) 70 in a common Tx/Rx aperture within focus optics 44 to couple the laser beam 52 from the laser transmitter 50 to either transmit telescope 56 or the common Tx/Rx telescope 38 and to couple the returned transmit signal and the passive emissions from the target to the detector 36. The path from transmit laser 50 to ASE 70 may be free-space (as shown reflected off fold mirror 72) or a fiber pigtail from the laser. See U.S. Pat. Nos. 6,792,028 and 7,626,152 and U.S. Patent Pub. 2003/0062468A1. The primary drawback of this configuration is backscatter of the laser beam from the ASE that tends to distort e.g., clutter or wash out, the image on the detector.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an optical sensor having active illumination and detection (passive or active) detection, capabilities with restricted volume, weight and power constraints. A Micro-Electro-Mechanical System (MEMS) Micro-Mirror Array (MMA) is configured to scan a narrow laser beam over a transmit FOR to provide active illumination and to correct the beam profile. A staring detector senses light within a receive FOR that at least partially overlaps the transmit FOR. By completely eliminating the dual-axis gimbal, this sensor architecture greatly reduces the volume and weight of the optical sensor while avoiding the deficiencies of known systems associated with either fiber or free-space coupling of the laser beam into an existing receiver.

To do this, the sensor must either sacrifice transmit and receive FOR or use other means to extend the FOR. The transmit FOR may be extended by cascading multiple MEMS MMAs, via a roller bearing configured either to rotate the entire optical sensor around a roll axis or the MEMS MMA subassembly or a rotation stage configured to offset the angle of MEMS MMA with respect to the roll axis. The receive FOR may be extended via the roller bearing or by implementing a more complex receive optical system or multiple detectors.

The optical sensor may be packaged in a volume as small as 2" in diameter and 12" in length if fully contained and as small as 2" in diameter and 2" in length if the transmitter is positioned outside the packaged volume.

In an embodiment the MEMS MMA, comprises a plurality of mirrors independently responsive to command signals to tip and tilt about first and second axes, respectively, and to piston in translation along a third axis in three degrees-of-freedom (3DOF). In an embodiment, each mirror is supported at three vertices of a triangle, wherein lines defined by three different pairs of vertices provide three axes at 60 degrees to one another in the XY plane. Each mirror pivots about each axis to produce tilt, tip and piston in the XYZ space.

Actuation of the mirrors in tip and tilt is primarily responsible to scan the laser beam in the narrow FOV over the transmit FOR. The MEMS MMA may be adaptively segmented to split the laser beam into a plurality of independent steered laser beams. The mirrors may be coated with dielectric coatings configured to reflect at different wavelengths to produce a spectral diversity across the one or more independently steered laser beams.

Piston is primarily responsible to correct a beam profile to improve active illumination. Piston can, for example be used in conjunction with tip/tilt to collimate the laser beam into the narrow FOV, to reduce aberrations from discontinuities between adjacent mirrors, to adjust a spatial intensity profile and cross-section/diameter of the laser beam or to correct a wavefront of the laser beam (such as for compensating for atmospheric distortion between the optical sensor and the target).

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2A and 2B, as described above, are schematic diagrams of an optical sensor in which a seeker is provided with active capabilities via a fiber wrapped around the gimbal and a free-space ASE, respectively, to scan both the Tx beam and Rx signal over the FOR;

FIGS. 3A and 3B are a schematic diagram of an optic sensor in which a MEMS MMA is used to scan the narrow FOV of a laser over a larger FOR and a staring detector detects passive light and possibly laser returns within an overlapping FOR;

FIG. 8 is a diagram of an optical sensor module attached to a missile airframe in which the optical sensor active illuminates and senses a FOR using body roll to point the FOR;

FIG. 9 is a diagram of an optical sensor module mounted on a roller bearing to pointed the FOR;

FIG. 11 is a diagram of an optical sensor module in which the MEMS MMA is mounted on a roller bearing to point the transmit FOR that includes multiple starting detectors to increase the receive FOR;

DETAILED DESCRIPTION OF THE INVENTION

The present invention provides a new sensor architecture adapted for new missions that require both active laser illumination and detection; passive, active or both that require compact volume and low power. The architecture uses a MEMS MMA to scan a laser beam over a FOR and to correct the beam profile. This approach minimizes the size weight and power of the sensor because only a small portion of the transmit FOR is illuminated at any instant. This minimizes the laser output required, which reduces the power to operate the laser and the power to maintain the laser at operating temperature. The MEMS MMA can be used to collimate the laser beam into the narrow FOV, to reduce aberrations from discontinuities between adjacent mirrors, to adjust a spatial intensity profile and cross-section/diameter of the laser beam or to correct a wavefront of the laser beam (such as for compensating for atmospheric distortion between the optical sensor and the target). The transmit FOR may be expanded by platform roll, use of a roller bearing to rotate the entire sensor module or just the MEMS MMA or a rotation stage to reorient the MEMS MMA. Instead of using a gimbal to perform the steering function of the detector, this architecture uses a staring detector to sense light, passive or active laser returns, in a receive FOR that overlaps the transmit FOR. The receive FOR may be expanded using more complex optical systems, multiple staring detectors or the roller bearing.

In certain cases, the transmitter may be positioned within the sensor volume to provide a self-contained modular optical sensor with active transmit and receive (passive or active) capabilities. This invention enables the compact, rugged sensor to perform missions that require passive detection and active laser illumination on a wide variety of platforms (e.g., missiles, rockets, guided projectiles, manned or unmanned aircraft, naval vessels, terrestrial vehicles or fixed platforms) in a wide variety of environments.

Figure 3A:
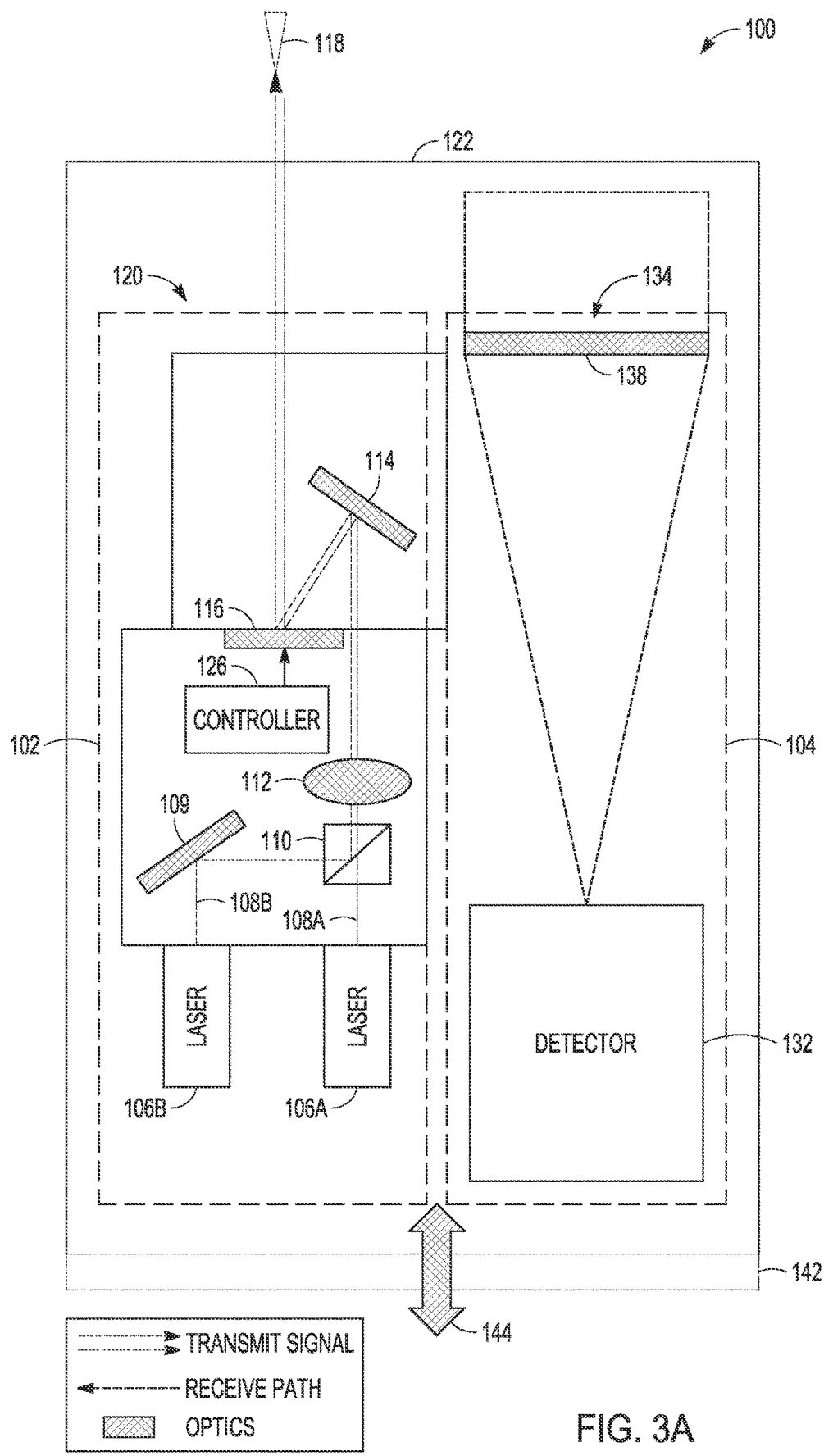
Figure 3B:
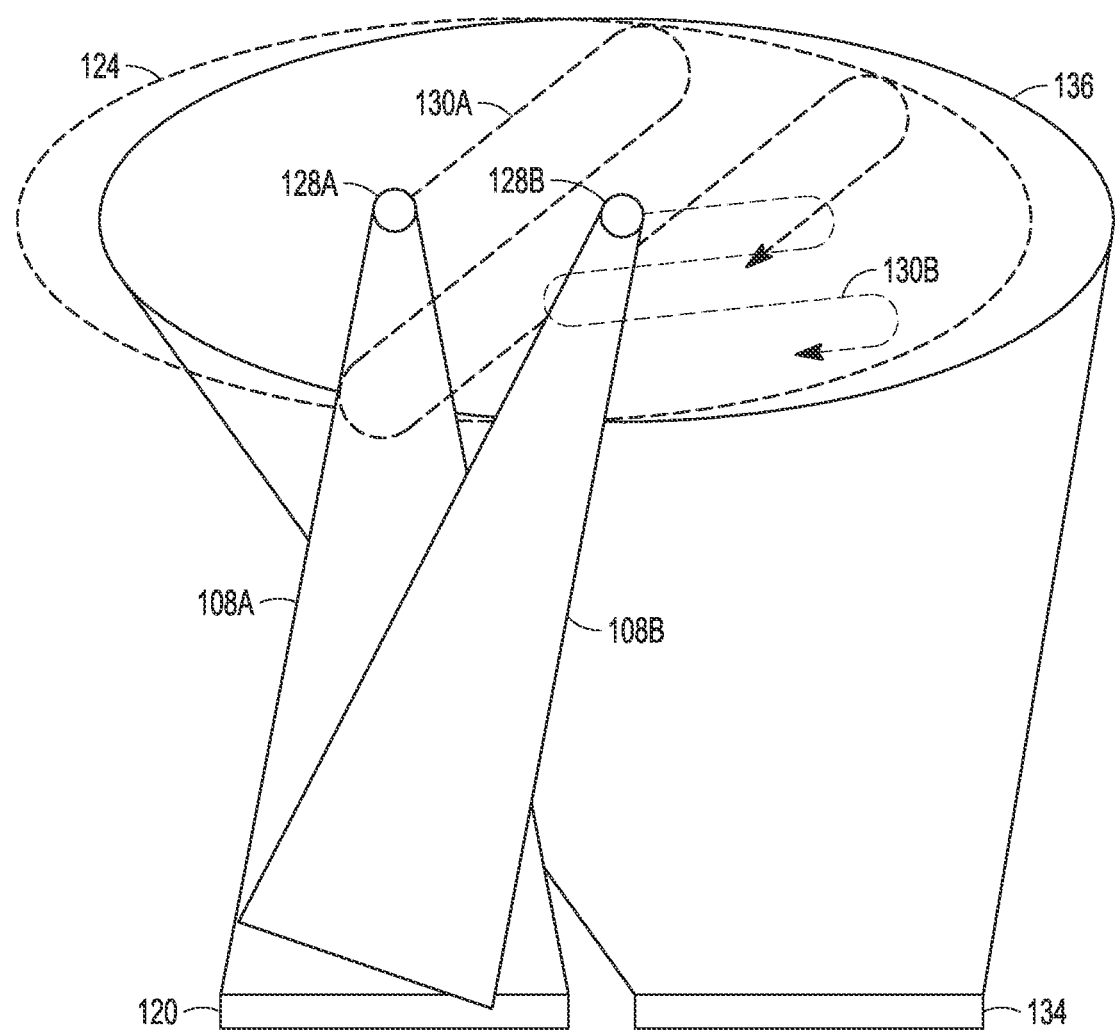

Referring now to FIGS. 3A and 3B, an embodiment of an optical sensor 100 includes separate active illumination and detection systems 102 and 104, respectively. As shown, the optical sensor is a fully self-contained module including the lasers. In other embodiments, the lasers may be positioned in the airframe and coupled into the sensor volume through the bulkhead via, for example, a direct path through an aperture, through a fiber, etc.

The active illumination system 102 includes one or more lasers 106a, b, . . . that emit laser beams 108a, b, . . . at different wavelengths in the UV, IR or visible spectrum of suitably at most 10 Watts of output power. A fold mirror 109 and beam combiner 110 combine laser beams 108a and 108b. A beam expander 112 expands the combined beam to illuminate a fold mirror 114 that redirects the combined beam to illuminate a MEMS MMA 116, which in turn corrects and scans the laser beam in a narrow FOV 118 of at most 0.1×0.1 degrees, and typically less than 0.02×0.02 degrees through a transmit aperture 120, suitably positionally-fixed with respect to the sensor, and optically transparent window/dome 122 over a transmit FOR 124 of at least 5×5 degrees. A MEMS MMA controller 126 generates the command signals to independently actuate the mirrors to scan and correct the laser beam. A low power laser (<10 W of output beam power), must transmit in a very narrow FOV in order to provide sufficient optical power density to its intended target.

In this particular embodiment, and as best shown in FIG. 3B, the MEMS MMA is configured to collimate the beams 108a and 108b into spots 128a and 128b, respectively, in the far-field and to independently steer the laser beams over respective patterns 130a and 130b in the transmit FOR 124. Alternately, a combined beam with multiple diverse wavelengths could be collimated and scanned over the transmit FOR.

In another embodiment, fold mirror 114 may itself be a MEMS MMA. Cascading two or more MEMS MMA in the optical path serves to expand the transmit FOR 124 and provides enhanced capabilities to correct the beam profile.

The detection system 104 includes a staring detector 132, a receive aperture 134, suitably positionally-fixed with respect to the sensor, that receives light within a fixed receive FOR 136 of at least 5×5 degrees that overlaps the transmit FOR 124 and a receive-path optical assembly 138 that couples light from the receive aperture to the staring detector. A simple conventional optical assembly 138 will typically provide a FOV (equal to the FOR 136) of approximately 30×30 degrees. The effective receive FOR may, as will be illustrated later, be increased by using multiple staring detectors, more complex optical systems, or roller bearings. The receive FOR 136 may be of the same extent as the transmit FOR 124, partially overlapping or fully included in a larger transmit FOR 124.

As shown in this schematic representation of an optical sensor, the laser beam is transmitted and passive or active returns collected in a FOR about a longitudinal axis of the optical sensor. This is simply for purposes of illustration. The optical system can be configured via fold mirrors to scan the laser beam and collect the passive or active returns at any desired angle to the longitudinal axis. For example, the optics could be turned 90 degrees (or less) off the longitudinal axis and the platform rolled to scan the Tx and Rx FOR through 360.

The staring detector is configured to detect optical emissions within a spectral band. The laser emits the laser beam within a narrow band about a specified wavelength. The laser wavelength may be "in-band" (within the spectral band of the detector) or "out-of-band (outside the spectral band of the detector). If "in-band", the detector may be configured to detect both passive emissions/reflected light and active returns. If "out of-band" the detector is configured to detect only passive emissions/reflected light. If multiple lasers at different wavelengths are coupled and transmitted via the telescope, one laser or both lasers may be "in-band" and/or "out-of-band."

As shown, optical sensor 100 is configured as a self-contained modular unit 140 that can be mounted on a platform (e.g., a missile, manned or unmanned flight vehicle, ship, terrestrial vehicle or fixed platform) via a bulkhead 142 and an interface (electrical, mechanical, thermal, communications) 144 through the bulkhead. The modular unit will have a defined volume in which all components must reside. The defined volume may a cylindrical volume less of approximate 2" in diameter and 12" in length. In order to package the sensor in such a confined volume while maximizing its available power, the transmit optical systems are entirely free-space. To accommodate such confined packaging is another reason for requiring a low power laser. If the laser(s) are positioned outside the sensor package, the package itself may be as small as 2" in diameter by 2" in length.

Figure 4A:
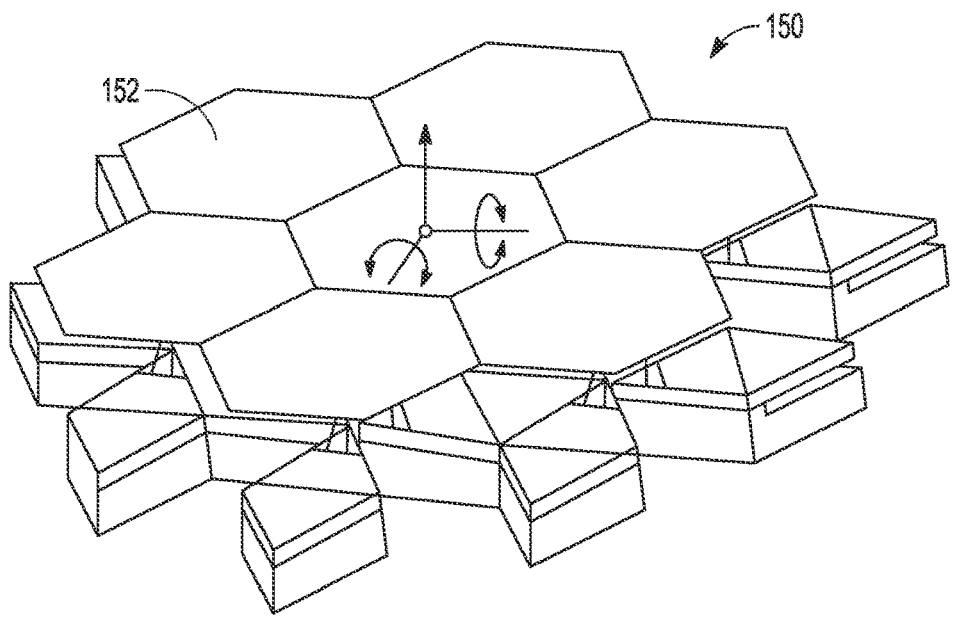
FIGS. 4A-4B are illustrations of a known embodiment of a Tip/Tilt/Piston ("TTP") MEMS MMA and a single mirror actuated to tip, tilt and piston to scan and correct the laser beam.
Figure 4B:
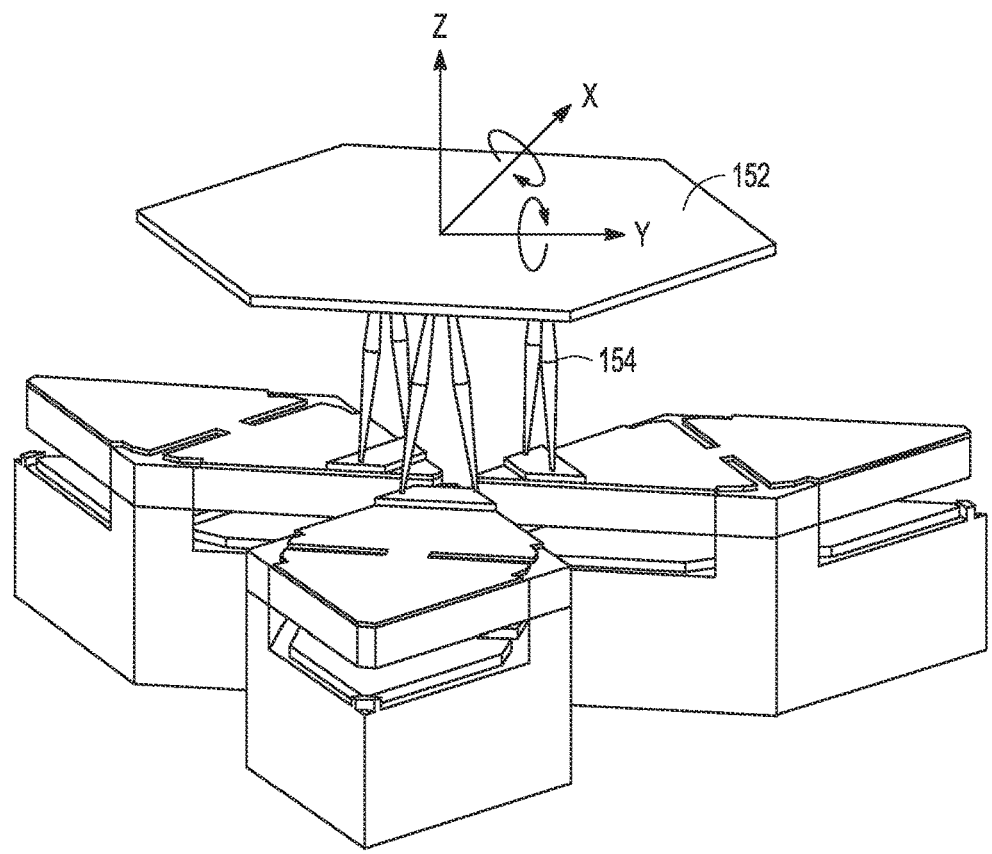

As best shown in FIGS. 4A-4B, an exemplary MEMS MMA 150 comprises a plurality of independently and continuously controllable mirrors 152 to re-direct light in three DOF. Each mirror is capable of at least "Tip" (rotation about an X-axis), "Tilt" (rotation about a Y-axis) and "Piston" (translation along a Z-axis, perpendicular to the XY plane) where the X, Y and Z are orthogonal axes in a three-dimensional space.

The MEMS MMA is preferably capable of tipping and tilting over range of at least −15°x+15° to steer over a range of +/−30°×30° and pistoning (translating) over a range of at least +/−15 microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

Figure 1:
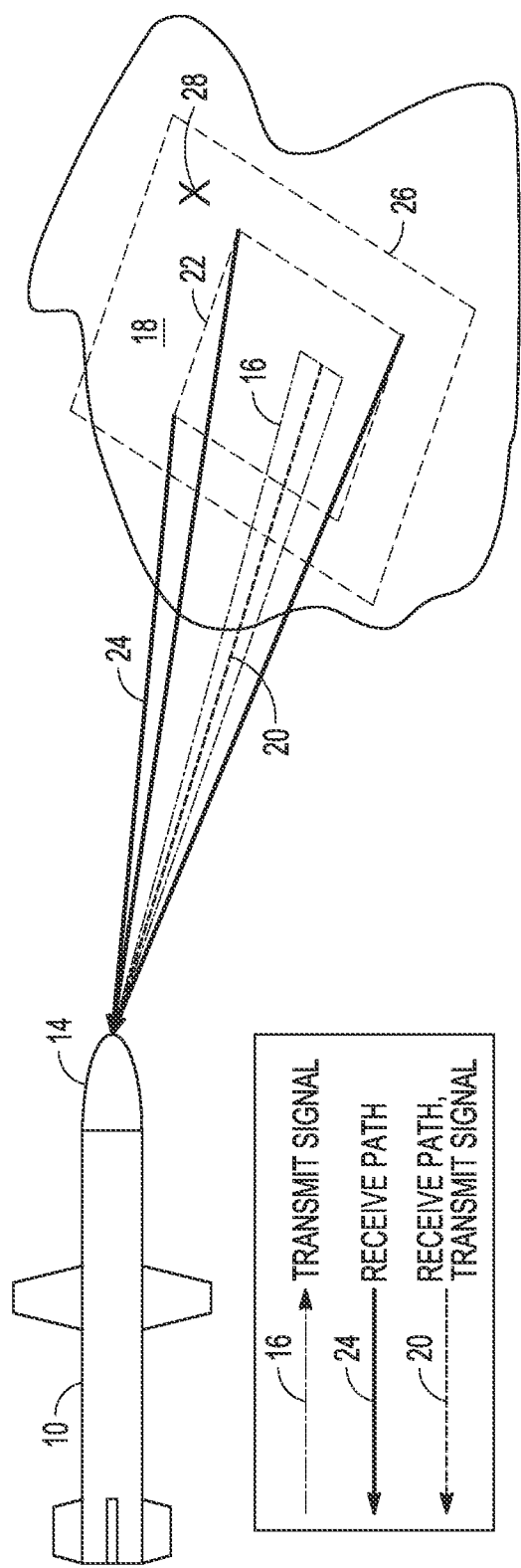
FIG. 1, as described above, is an optical sensor in which both the Tx beam and Rx signal are scanned over a FOR by a dual-axis gimbal.

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures 154 to support each mirror 152 at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

In addition to steering the laser beam to scan the transmit FOR, the MEMS MMA can be used to collimate the laser beam into the narrow FOV, to reduce aberrations from discontinuities between adjacent mirrors, to adjust a spatial intensity profile and cross-section/diameter of the laser beam or to correct a wavefront of the laser beam (such as for compensating for atmospheric distortion between the optical sensor and the target). The MEMS MMA may be segmented to split the incoming beam into a plurality of beams, which can be independently steered and corrected. The mirrors may be provided with dielectric coatings to reflect light at a particular wavelength. The mirrors may be provided with dielectric coatings to reflect light at different wavelengths. In combination, the MEMS MMA can generate, correct and steer a beam having different wavelengths (over time) or a diversity of wavelengths (at one time). The MEMS MMA can be commanded to change the number of beams and spectral diversity on the fly and to adapt the correction of the beam profile accordingly.

Figure 5:
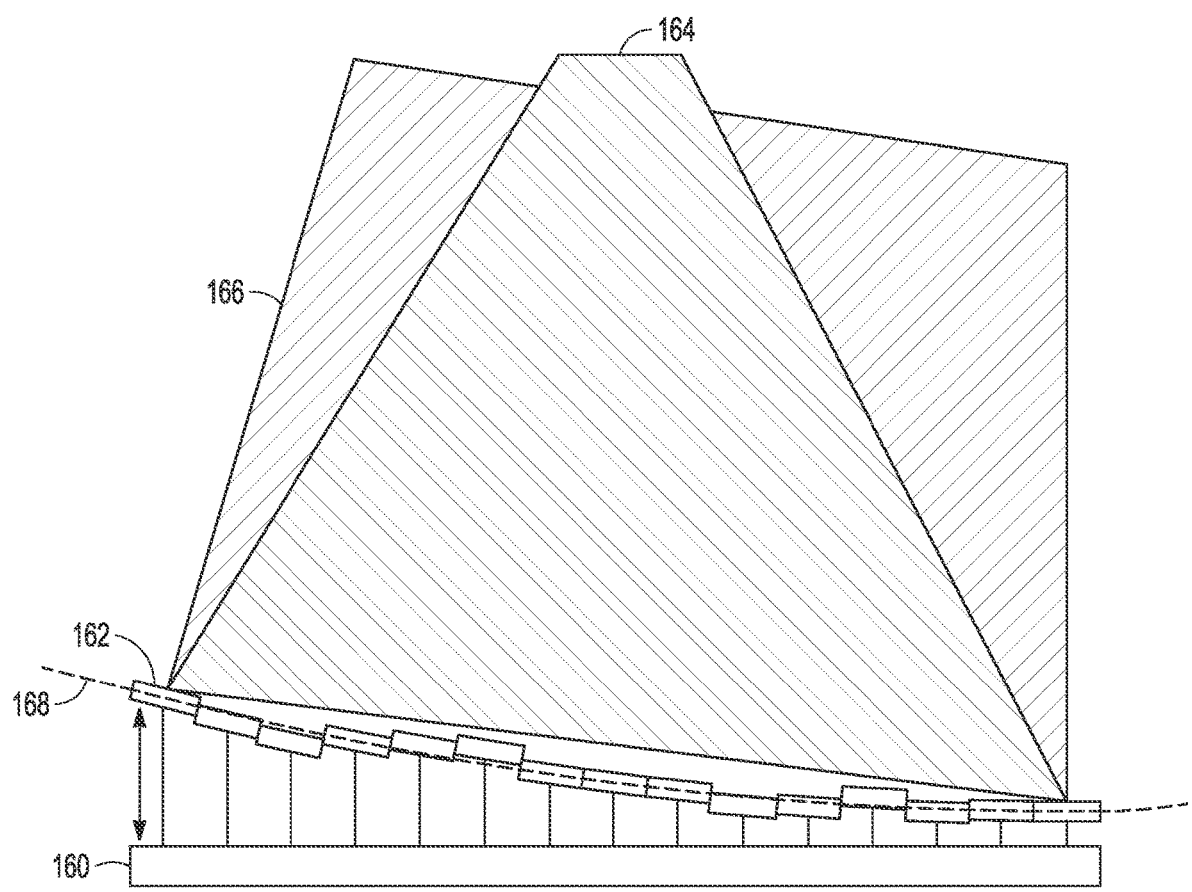
FIG. 5 is a diagram of a MEMS MMA in which the mirrors are actuated to scan, collimate, correct and reduce aberrations in the laser beam.

Referring now to FIG. 5, a MEMS MMA 160 includes a plurality of mirrors 162 that can tip, tilt and piston in 3DOF. A laser beam 164 is expanded to approximately fill the MEMS MMA 160 and is re-directed to scan the beam 166 at a specified steering angle. First, to re-direct and scan the beam, each of the mirrors 162 is tipped and tilted to the same nominal angles to achieve the specified steering angle. Second, the tip/tilt/piston of mirrors 162, particularly the mirrors towards the periphery of the device, are controlled to reduce the divergence of the beam such that re-directed beam 166 is approximately collimated into the narrow FOV to scan the beam in the far-field. In this example, the mirrors are further controlled to approximate a base curvature 168 to add optical power to the beam. Finally, in this example, the mirrors are selectively pistoned to correct the wavefront of re-directed beam 166 such as to compensate for atmospheric distortion between the optical sensor and the target.

Figure 6A:
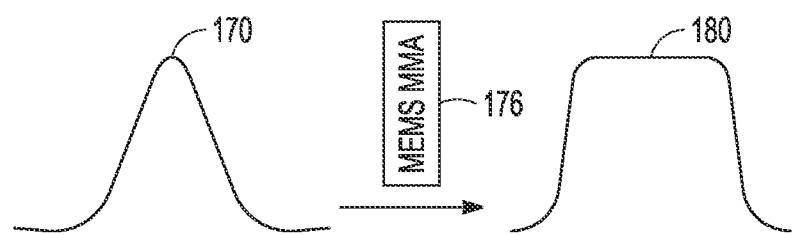
FIGS. 6A-6C illustrate adjustments to the spatial intensity profile to create a flat-top beam and to the cross-section to create a rectangular cross-section having a certain size.
Figure 6B:
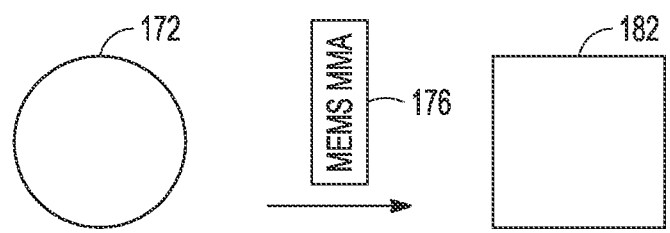
Figure 6C:
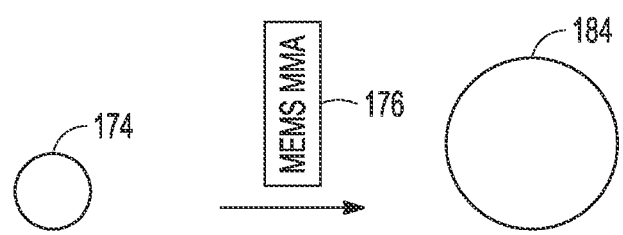

Referring now to FIGS. 6A-6C, a beam generated by the laser will typically have a Gaussian spatial intensity profile 170 with a circular cross-section 172 and a diameter 174. Piston from a MEMS MMA 176 can be used to correct the Gaussian spatial intensity profile 172 to a "flat-top" intensity profile 180 (or other desired profile) and Tip/Tilt can augment piston to adjust the circular cross-section 172 of the beam to a rectangular cross-section 182 (or other desired cross-section) of a certain diameter 184.

Figure 7A:
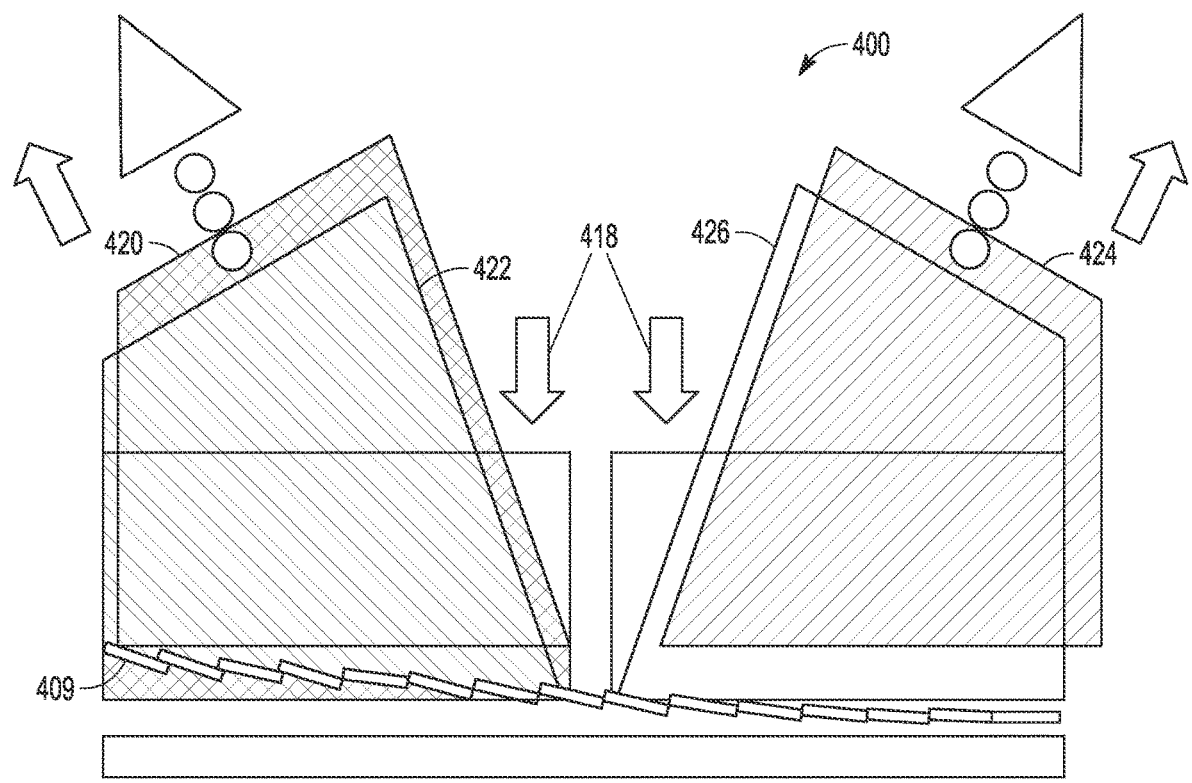
FIGS. 7A-7B are diagrams of an embodiment of a MEMS MMA in which mirrors have dielectric coatings that reflect at different wavelengths and are controlled to independently form, correct and steer multiple beams having a diversity of wavelengths
Figure 7B:
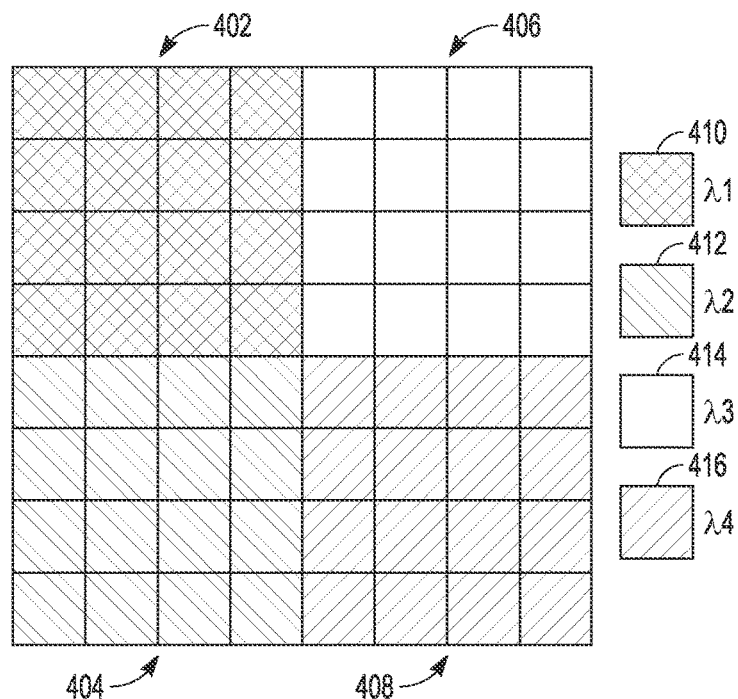

Referring now to FIGS. 7A-7B, as previously mentioned, the MEMS MMA can be configured through dielectric coatings of the mirrors to provide a diversity of wavelengths and command signals to split the incoming laser beam into a plurality of independently steerable (and profile corrected) laser beams. The MEMS MMA can be reconfigured on-the-fly to change the number of beams and the spectral content of those beams. In combination with the capability of the MEMS MMA to simultaneously correct the profiles of those beams to improve amplifier performance, static or time varying, or to compensate for atmospheric distortion, static or time varying, provides an amplified laser device with great flexibility.

Responsive to command signals from the controller, a MEMS MMA 400 is, for example, partitioned into four segments 402, 404, 406 and 408 each including a plurality of mirrors 409 illuminated by a beam 418. The mirrors in the different sections are provided with reflective coatings 410, 412, 414 and 416 at different wavelengths. In response to command signals, the MEMS MMA tips/tilts/pistons the mirrors in each segment to independently steer beams 420, 422, 424 and 426 and to correct the beam profiles. Responsive to command signals, the MEMS MMA can change the number of beams as well as the spectral composition of the beams.

Figure 8:
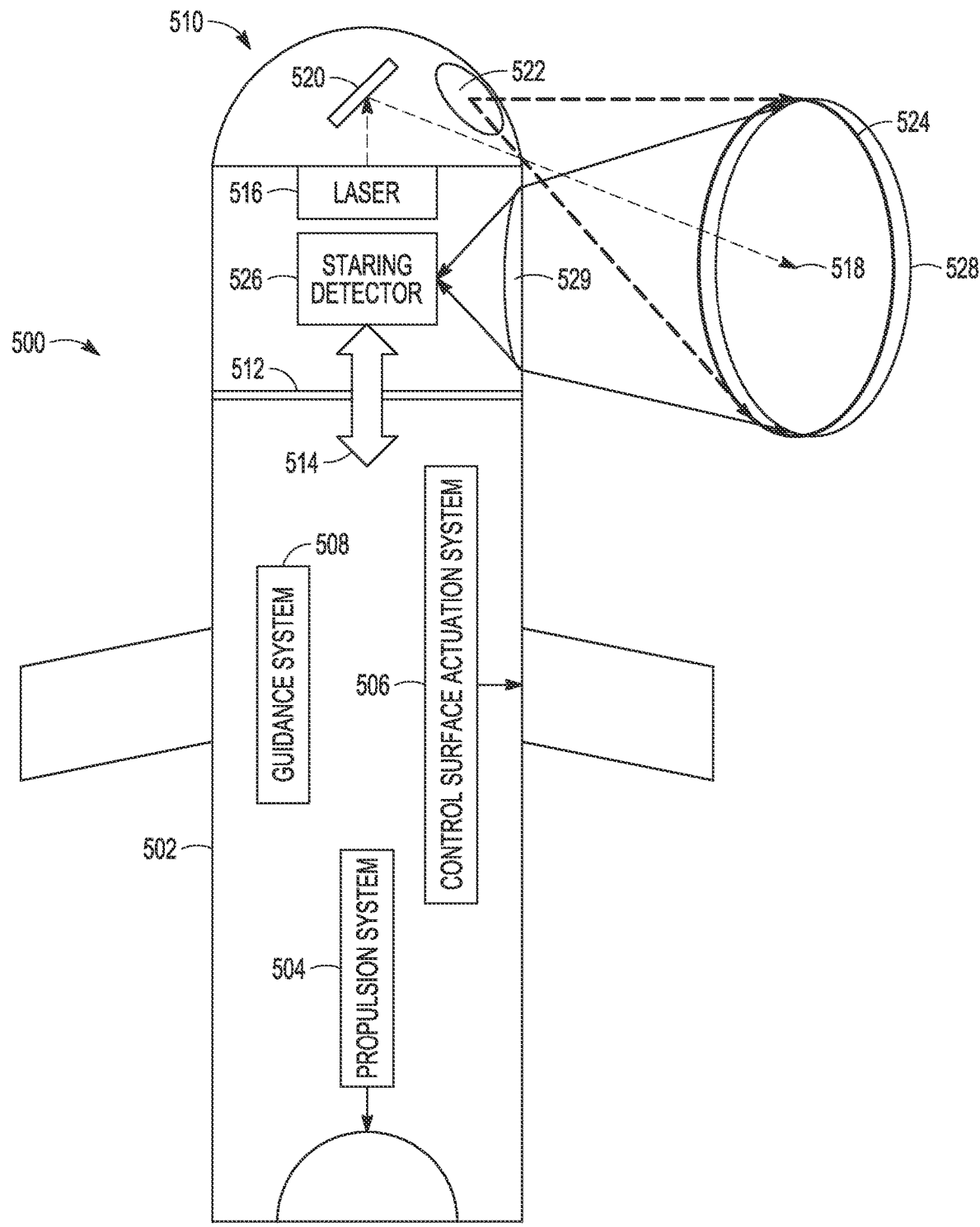

Referring now to FIG. 8, in an embodiment an unmanned flight vehicle 500 includes an airframe 502 including a propulsion system 504, a control surface actuation system 506 and a guidance system 508. A modular optical sensor unit 510 is mounted forward of a bulkhead 512 and includes an interface 514 for all power, electrical, mechanical or other coupling between the unit and the airframe.

In this particular configuration, the optical sensor and all of its components are positionally fixed. A laser 516 emits a laser beam 518 that is steered by a MEMS MMA 520 and transmitted through a window 522 in a narrow FOV to scan a transmit FOR 524. A staring detector 526 detects passive emissions/reflected light (and possibly active returns from the laser beam) within a receive FOR 528 that fully overlaps the transmit FOR. This is achieved through an off-gimbal receiver aperture 529 and a conventional optical system. The flight vehicle can roll or more generally maneuver to steer the fixed transmit and receive FOR to achieve greater sensor coverage.

Figure 9:
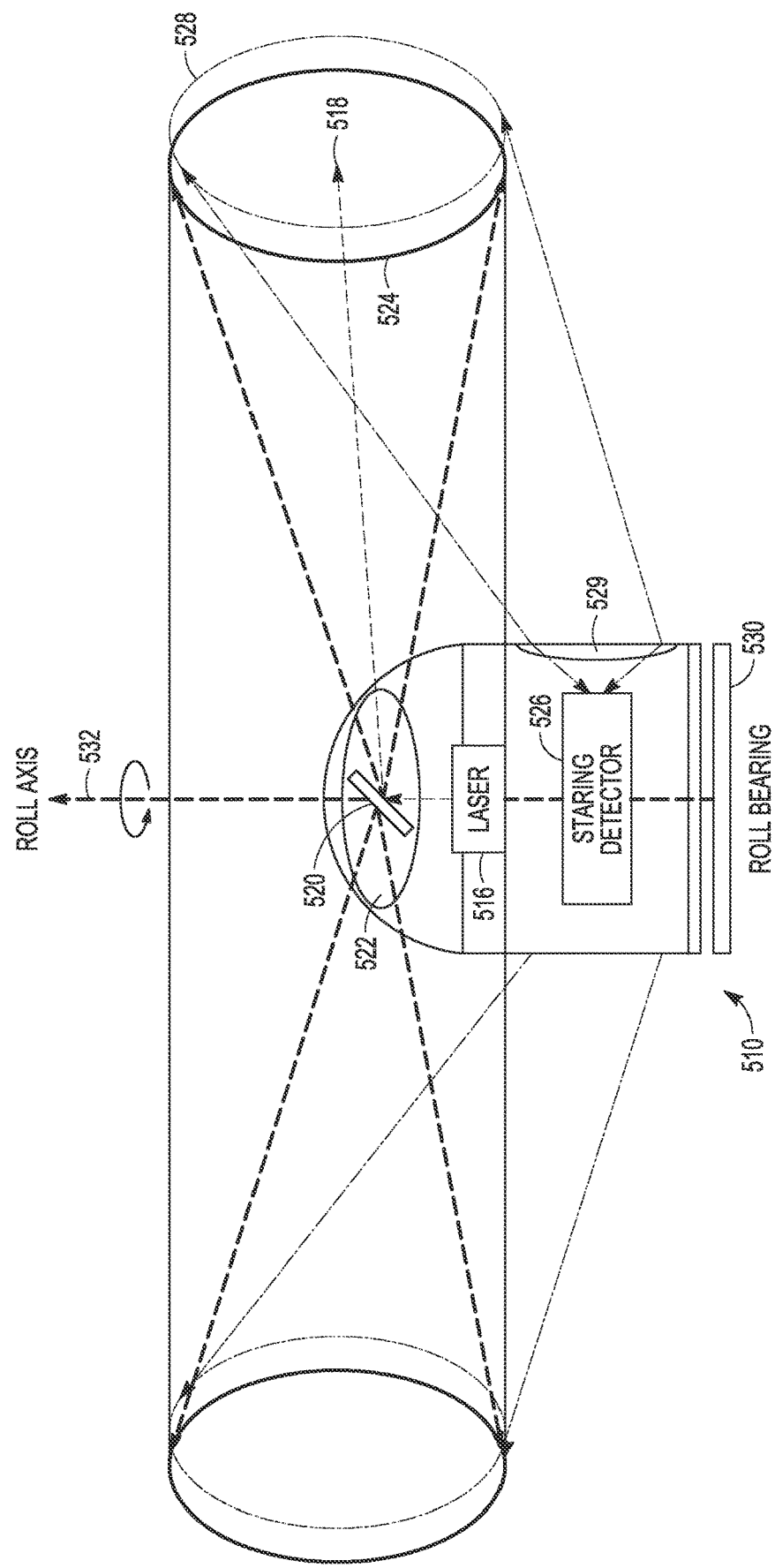

Referring now to FIG. 9, in an embodiment an optical sensor unit 510 is coupled to the airframe via a roll bearing 530 that rolls about a roll axis 532 (the longitudinal axis of the airframe). The z-axis of the MEMS MMA 520 is oriented perpendicular to roll axis 532 (or any desirable angle therebetween) such that tip/tilt about the x and y axis scan a cone that defines the transmit FOR 524. The roll bearing rotates the transmit FOR 524 and receive FOR 528 through 360 degrees to achieve greater sensor coverage. If the laser is positioned in the airframe, the roll bearing will rotate the optical sensor unit sans the laser.

Figure 10:
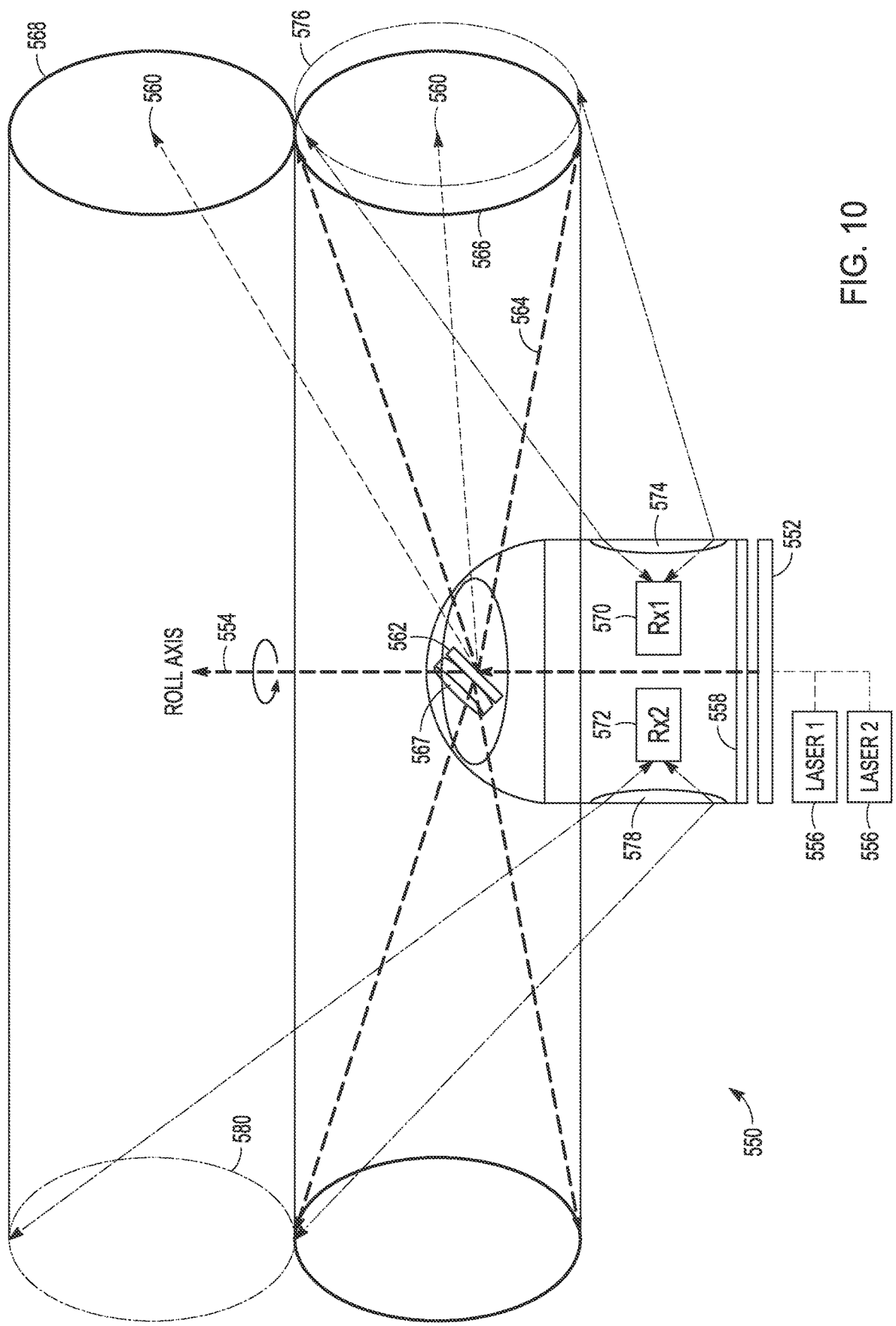
FIG. 10 is a diagram of an optical sensor module mounted on a roller bearing to point the fixed FOR and including a rotation state to offset the fixed FOR to the roll axis to increase coverage.

Referring now to FIG. 10, in an embodiment an optical sensor unit 550 is coupled to the airframe via a roll bearing 552 that rolls about a roll axis 554 (the longitudinal axis of the airframe). One or more lasers 556, positioned in this example behind bulkhead 558, emit laser beams 560 that are routed via an optical system (not shown) to illuminate a MEMS MMA 562, which in turn tips/tilts the mirrors about the x and y axes to scan a cone 564 to illuminate a transmit FOR 566. A rotation station 567 rotates the MEMS MMA 560 to point cone 564 in a different direction to actively illuminate another transit FOR 568 to achieve greater active illumination coverage. For example, if the MEMS MMA scans a 15×15 degree cone that is nominally perpendicular to roll axis 554, the rotation station 562 may tilt the MEMS MMA up 30 degrees towards the roll axis to scan a second contiguous 15×15 degree cone. In combination with roller bearing 552, the sensor now has the capability to actively illuminate a 30×30 cone rotated through 360 degrees.

To sense either passive light or active returns in both transmit FOR 566 and 568, the optical sensor is provided with two staring detectors 570 (Rx1) and 572 (Rx2), respectively. Receive optics 574 are configured to collect light within a receive FOR 576 that overlaps transmit FOR 566 and receive optics 578 are configured to collect light within a receive FOR 580 that overlaps transmit FOR 568.

Figure 11:
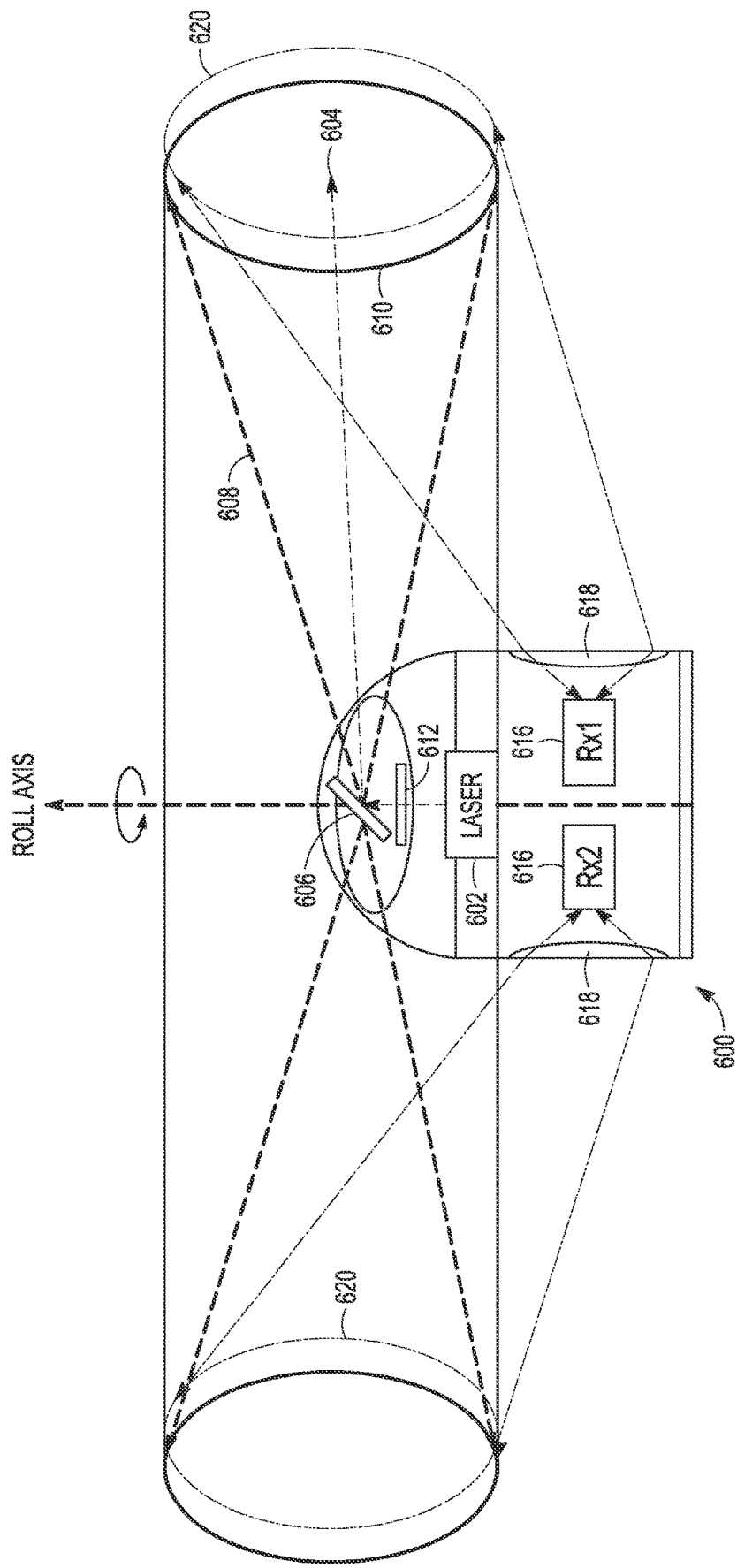

Referring now to FIG. 11, in an embodiment an optical sensor unit 600 includes a laser 602 that emits a laser beam 604 that is routed through an optical system (not shown) to illuminate a MEMS MMA 606, which in turn tips/tilts the mirrors about the x and y axes to scan a cone 608 to illuminate a transmit FOR 610. A roller bearing 612 is configured to rotate MEMS MMA 606 around a roll axis 614 to rotate transmit FOR 610 through 360 degrees. In different configurations, the entire optical transmit system may be mounted on roller bearing 612, the entire optical transmit system sans the laser or just the MEMS MMA.

Because the detection sub-system and the receive FOR do not rotate through 360 degrees either detection is severely limited as compared to active illumination or other means must be provided to effectively expand the receive FOR.

As shown in FIG. 11, a plurality of detection systems (e.g. a staring detector 616 and receive optics 618) are positioned around the optical sensor to collect light in a plurality of receive FOR 620 that are separated from one another but each overlap the transmit FOR 610. Instead of replicating the detection system to enhance the coverage of the transmit FOR, more complicated optical system can be implemented that expand the receive FOR of a single detection system as shown below in FIGS. 12 and 13.

U.S. Pat. No. 10,208,430 "Multi-Directional Optical Receiver and Method" discloses various techniques for expanding the approximately 30×30 degree FOV that conventional optical systems support for a staring detector. These techniques may be used in the present optical sensor when the receive FOR is fixed relative to the airframe.

Figure 12:
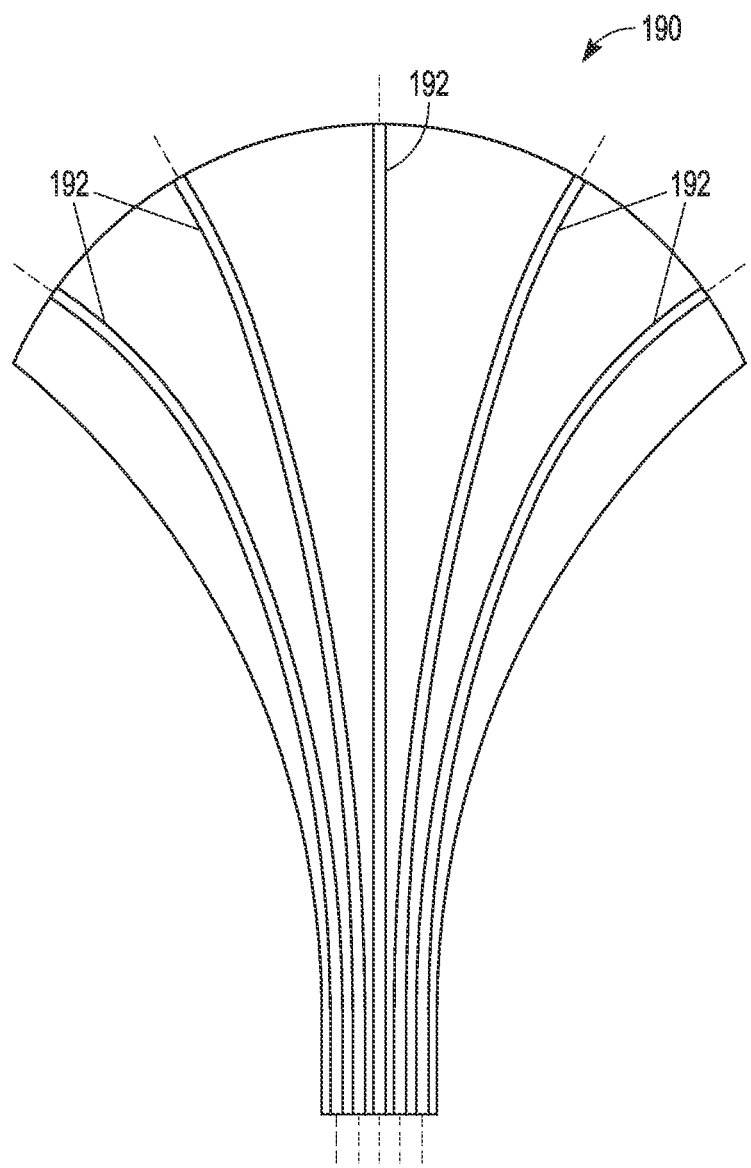
FIG. 12 is a diagram of a conventional hemispherical dome-shaped optical element that can extend the fixed receiver FOR to 180×180 degrees.

One approach to addressing multi-directional collection problems is a hemispherical dome-shaped optical element, such as the example optical element 190 shown in FIG. 12. Optical fibers 192 arranged along the perimeter of the dome-shaped element 190 map received optical radiation to a corresponding staring detector. Specifically, the dome-shaped element 190 allows the associated staring detector to receive optical radiation over a wider field of view than conventional focusing optics, due to the convex profile of the element 190. The FOV may, for example, be a full 360 degrees around the axis and 30 or more degrees perpendicular to the axis (e.g. the axis of symmetry of the dome-shaped element). While increasing the FOV of the receiver 190 when compared to a traditional staring detector, the convex profile of the receiver 190 still restricts the aperture diameter of the receiving system based on the acceptance angle of the fibers 192 in the area normal to the optical surface. Often this limits collection to only a fraction of the total number of optical fibers 192. Further, hemispherical dome-shaped optical receivers may experience relative illumination falloff (RIF) at the extremes of the dome-shaped surface, which can further restrict system performance.

Figure 13:
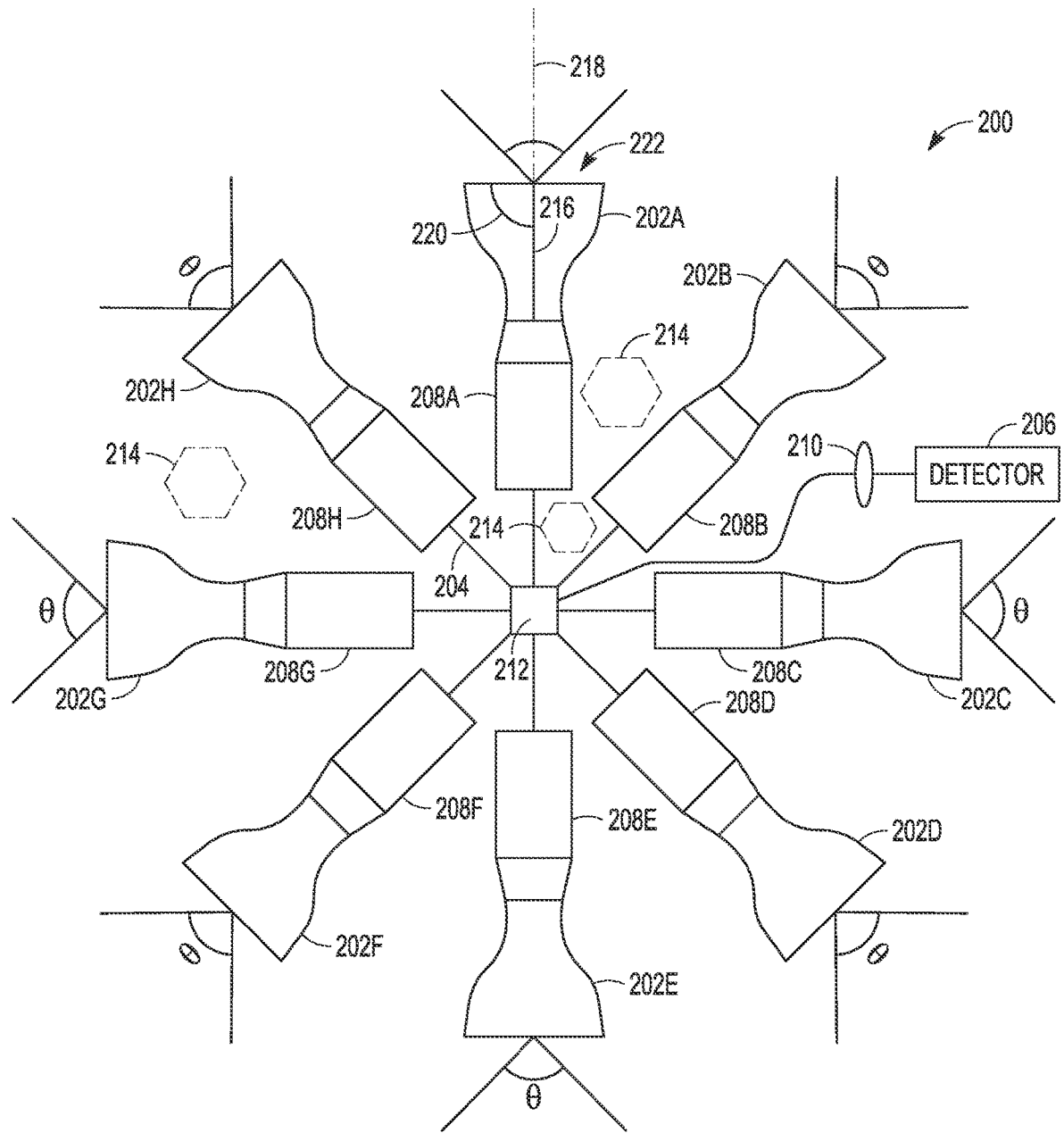
FIG. 13 is a diagram of a known multi-directional optical system that can extend the fixed receiver FOR to 360×30 degrees.

FIG. 13 is an example of an optical receiver 200 according to another approach. Among other components, the optical receiver 200 may include a plurality of fused fiber optic bundles 202 (i.e., fused fiber optic bundles 202a-202h), a fiber optic cable 204, and a single staring detector 206. As shown, the fiber optic cable 204 may be coupled to the staring detector 206 and each of the fused fiber optic bundles 202a-202h. In various embodiments, the optical receiver 200 also includes a plurality of fiber couplings 208 (i.e., fiber couplings 208a-208h), one or more optical elements 210 (e.g., a lens), and a fiber optic combiner or switch 212. As shown, each of the fused fiber optic bundles 202a-202h may terminate at a corresponding fiber coupling 208. The fiber couplings 208a-208h may be interposed between individual fused fiber optic bundles 202a-202h and the fiber optic cable 204. The one or more optical elements 210 are positioned to receive and focus optical radiation collected by the fused fiber optic bundles 202a-202h onto the staring detector 206.

In various embodiments, each of the fused fiber optic bundles 202a-202h of the optical receiver 200 is positioned to directly collect optical radiation from a scene. In contrast to various data transmission techniques which may utilize optical fibers to send and receive information, various examples of the fused fiber optic bundles 202a-202h discussed herein may each include one or more optical fiber (e.g., optical fiber 216) positioned to collect optical radiation. In one implementation, each of the fused fiber optic bundles 202a-202h may include numerous individual optical fibers, such as non-imaging optical fibers, fused together during a manufacturing process. For instance, the bundle 200a may include over a million fused optical fibers. In certain embodiments, the fused fiber optic bundles 202a-202h may include numerous unordered non-imaging optical fibers.

Individual optical fibers (e.g., optical fiber 216) of each of the fused fiber optic bundles 202a-202h may be rigid or flexible and may be constructed from glass or any other suitable material. In one example, individual optical fibers may be constructed from an infrared transmitting plastic. Such a material may be advantageous in certain implementations to further reduce the weight of the optical receiver 200 and allow the optical fibers to be included within a structure used as cladding for the fused fiber optic bundles 202a-202h. In various embodiments, the type of optical fiber chosen depends on the wavelength of the optical radiation collected. In particular, each optical fiber of a corresponding fiber optic bundle may be transmissive to the propagating wavelength of collected optical radiation, and may be coated with an anti-reflection coating to maximize efficiency and decrease noise.

In certain embodiments, one or more of the fused fiber optic bundles 202a-202h is a broadband fused fiber optic bundle configured to collect polychromatic incident optical radiation. In such an embodiment, the optical receiver 200 may further include one or more wavelength splitting optics configured to split the polychromatic optical radiation based on wavelength, and map each wavelength to a corresponding portion of the staring detector 206. In certain other examples, the staring detector 206 may include a color filter array, such as a Bayer filter, positioned proximate the staring detector 206 configured to filter the polychromatic optical radiation at the staring detector 206.

In similar arrangements, one or more of the fused fiber optic bundles 202a-202h may be a polarized fused fiber bundle having a polarized coating on a receiving surface thereof. For example, the polarized coating may enable collection of a single polarization of optical radiation. In such an embodiment, the optical receiver 200 may further include a polarization filter and/or a micro-grid polarizer proximate the staring detector 206. In one particular implementation, different optical fibers (e.g., optical fiber 216) within one or more of the fused fiber bundles 202a-202h may be arranged to accept polarized light at different angles. Optical radiation corresponding to a first polarization may be split from optical radiation corresponding to a second polarization with a Digital Mirror Device (DMD), which may direct the optical radiation to corresponding portions of the staring detector.

In certain embodiments, each of the fused fiber optic bundles 202a-202h may be a fiber taper. Each fiber taper may define a magnification ratio to expand or reduce the collected optical radiation to a suitable magnification level. For instance, each fiber taper may minify a spot size of collected optical radiation to enable collection at the respective fiber coupling 208a-208h and transmission on the fiber optic cable 204. While in one implementation, each fiber taper may have a magnification ratio of 5:1, in various other implementations the magnification ratio may depend on the particular application. For instance, the magnification ratio of each fiber taper may depend on the number of additional fused fiber tapers within the optical receiver 200.

Each optical fiber (e.g., optical fiber 216) of a fused fiber optic bundle 202 runs from a receiving surface of the corresponding fused fiber bundle, to a corresponding one of the fiber couplings 208a-208h. As shown, each receiving surface may include a substantially planar receiving surface, such as substantially planar receiving surface 222. A first end of each optical fiber included within a respective fused fiber bundle, and a fiber axis (e.g., fiber axis 218) of that respective fused fiber bundle, is positioned at an angle (e.g., angle 220) perpendicular to the substantially planar surface to collect incident optical radiation along the fiber axis. However, in various other examples, the substantially planar receiving surface may be oriented such that the angle (e.g., angle 220) relative to the fiber axis is non-perpendicular, and positioned at a tilted angle (e.g., less than 90 degrees). Such an implementation would permit the fused fiber optic bundle 202 to receive optical radiation along the fiber axis while being positioned to match the contour of a mounting surface.

Accordingly, each optical fiber within a fused fiber optic bundle has a field of view that, when combined with the field of view of the other fibers of that bundle increases the numerical aperture of the fused fiber optic bundle. The field of views of the fused fiber optic bundles 202a-202h are illustrated by angular range THETA. While in one example, each of the fused fiber optic bundles 202a-202h may have a similar field of view (e.g., 45 degrees), in various other examples, only a portion of the fused fiber optic bundles 202a-202h may share the same field of view, or each of the fused fiber optic bundles 202a-202h may have a different field of view. In the shown example, a second end of the optical fibers of each of the fused fiber optic bundles 202a-202h terminates at the corresponding fiber coupling 208a-208h.

In various embodiments, each of the fused fiber optic bundles 202a-202h may be positioned in a different direction relative to each of the other fused fiber optic bundles 202a-202h. That is, each fused fiber optic bundle may be spaced apart relative to another fused fiber optic bundle in at least one of an x-direction, y-direction, and z-direction, of a Cartesian coordinate system. In further embodiments, the fused fiber optic bundles 202a-202h spaced apart in a single horizontal plane for the convenience of illustration or each fused fiber optic bundle may be similarly positioned in more than one plane, such as the x-direction and the y-direction, the x-direction and the z-direction, and the z-direction and the y-direction. In certain further embodiments, each fused fiber optic bundle may be positioned within the x-direction, the y-direction, and the z-direction, to achieve a full isotropic field of view.

In certain embodiments, the number of fused fiber optic bundles 202a-202h included in the receiver 200, and the field of view of each of the fused fiber optic bundles 202a-202h, may be chosen to achieve an omnidirectional FOV for the staring detector 206. As discussed herein, an omnidirectional FOV may include a FOV that receives optical radiation substantially uniformly in all directions within a given plane (i.e., receives radiation uniformly within the x-direction, the y-direction, or the z-direction, of the Cartesian coordinate system). For example, the optical receiver 200 may include ten fused fiber optic bundles each having a FOV of substantially 36 degrees. Such an arrangement would define a 360 degree field of view for the staring detector 206. In another example, the optical receiver 200 may include eight fused fiber optic bundles each having a FOV of substantially 45 degrees. In various other implementations, other arrangements of fused fiber optic bundles 202a-202h may be positioned to collectively achieve a substantially 360 degree field of view.

While in at least one example, each of the fused fiber optic bundles 202a-202h may have a substantially uniform field of view, in various other implementations one or more of the fused fiber optic bundles 202a-202h may have a non-uniform field of view. For instance, one or more of the fused fiber bundles 202a-202h may be defined by a substantially non-symmetrical diameter, such as a non-circular diameter. In one example, the diameter of a fused fiber bundle may be substantially rectangular or substantially triangular. Such non-symmetrical arrangements may achieve a non-omnidirectional multi-directional FOV, such as non-circular FOV.

In other arrangements, the fused fiber optic bundles 202a-202h of the optical receiver 200 may be positioned to provide a multi-directional FOV of the staring detector 206 despite the presence of one or more objects that would otherwise obstruct the optical layout of a conventional optical receiver. Specifically, one or more of the fused fiber optic bundles 202a-202h may be positioned such that the location of the fused fiber optic bundle avoids obstructing object within the presence of the optical receiver or an associated system. For example, fused fiber optic bundles 202a, 202b, 202g, 202h may be positioned such that obstructing objects 214 are outside a field of thereof. In other arrangements, the fused fiber optic bundles 202a-202h may be positioned to achieve a desired FOV while avoiding items that would otherwise break a line of sight of the optical receiver 200. In such an arrangement, fused fiber optic bundles 202a-202h may be symmetrically, non-symmetrically, or arbitrarily positioned to achieve the desired FOV while avoiding other structural and internal components of the optical receiver 200 and/or an associated optical system.

Optical radiation collected by one or more of the fused fiber optic bundles 202a-202h is received by the corresponding fiber coupling 208a-208h at the terminating end of the respective fused fiber optic bundle 202. The one or more fiber couplings 208a-208h may each include a series of inputs and outputs configured to receive the collected optical radiation and propagate the collected optical radiation to the fiber optic cable 204. For example, the fiber couplings 208a-208h may each include a multi-mode fiber coupling having multiple inputs configured to combine the collected optical radiation to a single output. In certain examples, each of the fiber couplings 208a-208h may include a microlens array. In particular, the fiber couplings 208a-208h may include a high numerical aperture microlens array having dimensions to match a terminating end of the corresponding fused fiber bundle 202a-202h. The fiber couplings 208a-208h may further include focusing optics, such as one or more collimator, to focus the optical radiation onto the fiber optic cable 204.

In various embodiments, the fiber optic cable 204 is coupled to each of the fused fiber optic bundles 202a-202h by the fiber couplings 208a-208h. The fiber optic cable 204 is configured to receive and propagate the collected optical radiation from the fused fiber optic bundles 202 to the single staring detector 206. As discussed herein, the plurality of fused fiber optic bundles 202a-202h routed to the single staring detector 206 by the fiber optic cable 204 define a substantially omnidirectional field of view of the staring detector 206. In one example, the fiber optic cable 204 is a multi-mode fiber optic cable fused into a single optical fiber for efficiently propagating collected optical radiation to the staring detector 206. In various embodiments, the collected optical radiation may include collected short-wavelength infrared (SWIR) radiation reflected from the scene. However, in various other implementations the optical radiation may include light of other wavelengths within the electromagnetic spectrum, such as near-infrared radiation (NIR), mid-wavelength infrared (MWIR), long-wavelength infrared (LWIR), or visible light.

Collected optical radiation propagates along the length of the fiber optic cable 204 and is received at the single staring detector 206. As shown, the optical element 210 may be positioned to focus the collected optical radiation onto one or more individual unit cells of the staring detector 206. The optical element 210 may include a single lens or mirror or a combination of lenses or mirrors. For example, the optical element 210 may be a singlet lens.

In various embodiments, the staring detector 206 includes a photodetector having a spectral band chosen to match a wavelength of the collected optical radiation. The staring detector 206 may include a Focal Plane Array (FPA) positioned at a focal plane of the optical receiver 200, and including a plurality of photo-sensitive unit cells (i.e., "pixels") each configured to individually receive the collected optical radiation. When activated, individual unit cells within the FPA integrate photons of radiation impinging on the unit cell. A circuit within each unit cell of the FPA accumulates charge corresponding to the incident radiation. At the end of an integration period, the unit cells may be deactivated, and a read-out value corresponding to the accumulated charge may be provided. In various embodiments, the FPA may include a reduced number of unit cells, such as a single linear array of unit cells (i.e., a single row or column of unit cells). In other embodiments, the staring detector may include a single unit cell. Unit cells may include complementary metal-oxide semiconductor (CMOS) sensors or charge coupled devices (CCD).

As FIG. 8 shows, in at least one example the optical receiver 200 may include a fiber optic switch 212, or other fiber optic combiner, coupled to the fiber optic cable 204. The fiber optic switch 212 is configured to selectively control the propagation of the collected optical radiation to the staring detector 206. Specifically, the fiber optic switch 212 may be configured to selectively control propagation from the fused fiber bundles 202a-202h to unit cells of a single linear array of unit cells, or a single unit cell, of the staring detector 206. While the fiber optic switch 212 is shown in FIG. 8 as a single fiber optic switch for the convenience of illustration, in various other implementations the fiber optic switch may be composed of an plurality of fiber optic switches (or combiners), each switch coupled to a fiber bundle of the fused fiber bundles 202a-202h.

In such an implementation, the fiber optic switch 212 allows unit cells of the staring detector 206 to be switched to receive optical radiation from the various fused fiber optic bundles 202a-202h of the optical receiver 200. The fiber optic switch 212 may include mechanical switches, electro-optic switches, micro-electro-mechanical switches (MEMS), magneto-optic switches, or acoustic-optic switches, to name a few examples. The fiber optic switch 212 of various embodiments may include a plurality of inputs coupled to each of the fiber couplings 208a-208h via the fiber optic cable 204, each input capable of disengaging with a given fiber coupling. For example, the fiber optic switch 212 may engage with only those fiber optic couplings corresponding to fused fiber optic bundles currently receiving radiation. As the fused fiber optic bundles currently receiving radiation may change as the receiver 200 moves, or the area of the scene viewed changes, the fiber optic switch 212 may rapidly engage and disengage with any of the fiber optic couplings 208a-208h.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor, comprising:
an active illumination sub-system including
   a laser configured to emit a laser beam of at most 10 Watts of output power; and
   a first Micro-Electro-Mechanical System (MEMS) Micro-Mirror Array (MMA), said first MEMS MMA comprising a plurality of mirrors independently responsive to command signals to tip and tilt about first and second axes, respectively, and to piston in translation along a third axis in three degrees-of-freedom (3DOF) to correct a beam profile and to scan the laser beam in a field-of-view (FOV) of at most 0.1×0.1 degrees through a transmit aperture over a first transmit field-of-regard (FOR) of at least 5×5 degrees; and
a first detection sub-system including
   a staring detector;
   a receive aperture separate from the transmit aperture, said receive aperture configured to receive light within a first receive FOR of at least 5×5 degrees that overlaps the first transmit FOR; and
   a receive-path optical assembly that couples light from the receive aperture to the staring detector.

2. The optical sensor of claim 1, further comprising a second MEMS MMA positioned in an optical path between the laser and the transmit aperture, said second MEMS MMA responsive to additional command signals to tip, tilt and piston a plurality of mirrors to cascade the scanning of the laser beam to increase a coverage of the first transmit FOR.

3. The optical sensor of claim 1, wherein the first transmit and first receive FOR are fixed at at least 30×30 degrees.

4. The optical sensor of claim 1, further comprising a bearing assembly configured to rotate the first MEMS MMA and the first detection sub-system around a roll axis to scan the first transmit FOR and first receive FOR through 360 degrees.

5. The optical sensor of claim 4, further comprising:
a rotation stage configured to rotate the first MEMS MMA to scan the laser beam over a second transmit FOR; and
a second detection subsystem configured to receive light within a second receive FOR that overlaps the second transmit FOR.

6. The optical sensor of claim 1, further comprising a bearing assembly configured to rotate at least the first MEMS MMA around a roll axis to scan the first transmit FOR through 360 degrees, wherein the receive-path optical assembly is fixed.

7. The optical sensor of claim 6, further comprising a second detection sub-system configured to receive and detect light within a second receive FOR of at least 5×5 degrees that overlaps the first transmit FOR and does not overlap the first receive FOR.

8. The optical sensor of claim 6, wherein the receive-path optical assembly comprises a plurality of optical fibers arranged along a perimeter of a dome-shaped element such that the first receive FOR covers a hemispheric region.

9. The optical sensor of claim 6, wherein the receive-path optical assembly comprises a plurality of fused fiber optic bundles, each fused fiber optic bundle including a bundle of unordered non-imaging optical fibers and being positioned to directly collect optical radiation from a scene at a corresponding planar receiving surface thereof, at least a first fused fiber optic bundle of the plurality of fused fiber optic bundles including a polarized coating on the corresponding planar receiving surface thereof; a multi-mode fiber optic cable coupled to each fused fiber optic bundle of the plurality of fused fiber optic bundles, the multi-mode fiber optic cable configured to propagate the collected optical radiation from each of the plurality of fused fiber optic bundles along a length of the multi-mode fiber optic cable; said staring detector having at least one unit cell, the staring detector coupled to the multi-mode fiber optic cable and configured to receive the collected optical radiation from the plurality of fused fiber optics bundles via the multi-mode fiber optic cable, wherein in combination a field of view of each fused fiber optic bundle of the plurality of fused fiber optic bundles collectively defines the first receive FOR as an omnidirectional receive FOR of the staring detector; and a fiber optic switch coupled to the multi-mode fiber optic cable, the fiber optic switch being configured to selectively control propagation of the collected optical radiation to the at least one unit cell of the staring detector.

10. The optical sensor of claim 1, further comprising a beam expander that expands the laser beam from the laser to illuminate the first MEMS MMA, wherein the first MEMS MMA mirrors are responsive to the command signals to tip, tilt and piston the to correct the profile of the beam to add optical power to reduce beam divergence and project the laser beam into the FOV.

11. The optical sensor of claim 1, wherein the first MEMS MMA mirrors are responsive to the command signals to tip and tilt the plurality of mirrors at a same angle to scan the laser beam over the first transmit FOR and to selectively piston the plurality of mirrors to correct the profile of the beam to reduce aberrations from discontinuities between adjacent mirrors as the plurality of mirrors tip and tilt to scan the laser beam.

12. The optical sensor of claim 1, wherein the first MEMS MMA mirrors are responsive to the command signals to tip, tilt and piston to correct the profile of the beam to correct a spatial intensity profile or a cross-section size or shape of the laser beam.

13. The optical sensor of claim 1, wherein the first MEMS MMA mirrors are responsive to the command signals to piston to correct a wavefront of the laser beam.

14. The optical sensor of claim 1, wherein the first MEMS MMA mirrors are responsive to the command signals to separate the laser beam into a plurality of independently steered and profile corrected laser beams.

15. The optical sensor of claim 14, wherein the laser is either a broadband laser that produces a laser beam that spans a plurality of different wavelengths or comprises a plurality of lasers that emit laser beams at a plurality of different wavelengths, wherein the plurality of mirrors have dielectric coatings configured to reflect at different wavelengths to produce a spectral diversity across the plurality of independently steered and profile corrected beams.

16. The optical sensor of claim 11, wherein the laser is either a broadband laser that produces a beam that spans a plurality of different wavelengths or comprises a plurality of lasers that emit laser beams at a plurality of different wavelengths, wherein the plurality of mirrors have dielectric coatings configured to reflect at different wavelengths to produce a spectral diversity across the scanned and profile corrected laser beam.

17. The optical sensor of claim 1, wherein the sensor is a module sensor unit that is contained in a cylindrical volume having a diameter of 2" or less and a length of 12" or less, further comprising an interface for connection to a mounting platform.

18. An optical sensor, comprising:
an active illumination sub-system including
a laser configured to emit a laser beam of at most 10 Watts of output power; and
a Micro-Electro-Mechanical System (MEMS) Micro-Mirror Array (MMA), said MEMS MMA comprising a plurality of mirrors independently responsive to command signals to tip and tilt about first and second axes, respectively, and to piston in translation along a third axis in three degrees-of-freedom (3DOF) to correct a beam profile and to scan the laser beam in a field-of-view (FOV) of at most 0.1×0.1 degrees through a transmit aperture over a transmit field-of-regard (FOR) of at least 5×5 degrees,
a detection sub-system including
a staring detector;
a receive aperture separate from the transmit aperture, said receive aperture configured to receive light within a receive FOR of at least 5×5 degrees that overlaps the transmit FOR, and
a receive-path optical assembly that couples light from the receive aperture to the staring detector; and
a bearing assembly configured to rotate at least the fret MEMS MMA around a roll axis to scan the transmit FOR through 360 degrees.

19. The optical sensor of claim 18, wherein the bearing assembly is configured to rotate at least the MEMS MMA and the detection sub-system around the roll axis to scan both the transmit FOR and receive FOR through 360 degrees.

20. An optical sensor, comprising:
an active illumination sub-system including
a laser configured to emit a laser beam of at most 10 Watts of output power; and
a Micro-Electro-Mechanical System (MEMS) Micro-Mirror Array (MMA), said MEMS MMA comprising a plurality of mirrors independently responsive to command signals to tip and tilt about first and second axes, respectively, and to piston in translation along a third axis in three degrees-of-freedom (3DOF); and
a beam expander positioned to expand the laser beam to illuminate the MEMS MMA,
wherein the MEMS MMA mirrors are responsive to tip, tilt and piston to reduce a divergence of the laser beam into a field-of-view (FOV) of at most 0.1×0.1 degrees through a transmit aperture and to scan the laser beam over a transmit field-of-regard (FOR) of at least 5×5 degrees; and
a detection sub-system including
a staring detector;
a receive aperture separate from the transmit aperture, said receive aperture configured to receive light within a receive FOR of at least 5×5 degrees that overlaps the transmit FOR; and
a receive-path optical assembly that couples light from the receive aperture to the staring detector.

21. An optical sensor, comprising:
an active illumination sub-system including
a laser configured to emit a laser beam; and
a first Micro-Electro-Mechanical System (MEMS) Micro-Mirror Array (MMA), said first MEMS MMA comprising a plurality of mirrors independently responsive to command signals to tip and tilt about first and second axes, respectively, to scan the laser beam in a field-of-view (FOV) of at most 0.1×0.1 degrees through a transmit aperture over a first transmit field-of-regard (FOR) of at least 5×5 degrees; and a first detection sub-system including a staring detector;

a receive aperture separate from the transmit aperture, said receive aperture configured to receive light within a first receive FOR of at least 5×5 degrees that overlaps the first transmit FOR; and a receive-path optical assembly that couples light from the receive aperture to the staring detector.

* * * * *

UNITED STATES PATENT AND TRADEMARK OFFICE
CERTIFICATE OF CORRECTION

PATENT NO. : 11,644,542 B2
APPLICATION NO. : 17/479896
DATED : May 9, 2023
INVENTOR(S) : Shott et al.

It is certified that error appears in the above-identified patent and that said Letters Patent is hereby corrected as shown below:

In the Specification

In Column 7, Line 38, delete "172" and insert --170-- therefor

In Column 8, Line 42, delete "transit" and insert --transmit-- therefor

In the Claims

In Column 15, Line 29, in Claim 10, after "piston", delete "the"

In Column 16, Line 25, in Claim 18, delete "FOR," and insert --FOR;-- therefor

Signed and Sealed this
Twentieth Day of August, 2024

Katherine Kelly Vidal
*Director of the United States Patent and Trademark Office*